United States Patent [19]

Coffron

[11] 4,370,728
[45] Jan. 25, 1983

[54] STATIC STIMULUS TESTER FOR MICROPROCESSOR SYSTEMS

[75] Inventor: James W. Coffron, Palo Alto, Calif.

[73] Assignee: Creative Microprocessor Systems, Los Gatos, Calif.

[21] Appl. No.: 111,830

[22] Filed: Jan. 14, 1980

[51] Int. Cl.³ .................. G06F 11/00; G06F 11/20
[52] U.S. Cl. .................................................. 364/900
[58] Field of Search ... 364/200 MS File, 900 MS File

[56] References Cited

PUBLICATIONS

μScope 820 Microprocessor System Console, Intel Catalogue Sheet #9800495B.

μScope 820 Microprocessor System Console, Operator's Handbook ©1977, 1978.

*Primary Examiner*—Gareth D. Shaw
*Assistant Examiner*—John G. Mills
*Attorney, Agent, or Firm*—Ronald E. Grubman

[57] ABSTRACT

The present invention provides a device which takes the place of the microprocessor in a microprocessor-based system, and which provides the user with manual control and monitoring of the logic level of each separate input or output pin corresponding to the same pin of the single chip microprocessor of the system under test.

5 Claims, 7 Drawing Figures

STATIC STIMULUS TESTER FOR MICROPROCESSOR SYSTEMS

BACKGROUND OF THE INVENTION

This invention is concerned generally with testing of microprocessor systems, and more particularly, with a device for controlling and monitoring the microprocessor in the system.

With the rapidly escalating use of microprocessors in electronic systems of all kinds, the testing and debugging of such systems has become a major concern. In the prior art, it is known to use "signature analysis" at various points in the system. This can be accomplished with a device such as the Model 5004A by Hewlett-Packard Company, which compares a known "good" bit stream against the empirical bit stream measured at selected test points in the system. Although some information is obtained through the signature analysis, detailed information about the system operation is not revealed.

The use of logic state analyzers such as the Model 1661A by Hewlett-Packard Company provides more information about the system under test. These analyzers provide passive monitoring of the hardware and measurement of logic levels on the system data bus, address bus and control bus lines. Although information about the system is received, control of the system is not obtained through such devices.

The deficiency of logic state analyzers related to control has been remedied by the use of in-circuit emulators such as the ICE-80 (8080 in-circuit emulator) from Intel Corporation, which are microprocessor based test systems which perform exactly like the microprocessor component system under test. Generally, the emulation of the microprocessor is accomplished on a small computer system, so that the user has some control over data entry and output into the system under test. However, detailed control of each microprocessor pin is still not possible.

In yet another level of sophistication of the in-circuit emulator, a "stand in" for the microprocessor has been developed which enables the user to single step through the normal sequencing of the microprocessor in the system under test. Even with the use of these stand in testers, it is still a problem with the testing of microprocessor systems in that control of the microprocessor is limited to the single "machine cycle." That is, the microprocessor can only be "frozen" or stopped in certain very specified electrical cases.

SUMMARY OF THE INVENTION

In accordance with the illustrated preferred embodiments, the present invention provides a device which takes the place of the microprocessor in a microprocessor-based system, and which provides the user with manual control and monitoring of the logic level of each separate input or output pin corresponding to the same pin of the single chip microprocessor of the system under test. Thus, a device according to the invention allows the user to manually control any signal within the system that the system microprocessor would normally control, statically adjusting the logic levels of each signal line without regard to order or past history of the system. The user can therefore verify the operational status of any part of the system, whether or not the system, as a whole, is operational. Feedback loops of the system can be broken, and intermediate points of the loop directly accessed. Individual pins can be electrically stimulated and monitored to locate a "stuck" bit. Additionally, the user can exercise selected communications paths in the system, while monitoring the signal integrity at all points.

DETAILED DESCRIPTION OF THE PREFERRED EMBODIMENT

A device according to the invention will sometimes be referred to hereinafter as a Static Stimulus Tester, or "SST." In FIG. 1, there is shown a microprocessor (MP) 11 used in the SST, which may be, e.g., the model number 8080 available from the Intel Corporation, Sunnyvale, Calif. Processor 11 is accessed by the user through a keyboard 13, to be described in more detail hereinafter. Information from the processor is displayed on a display 1$, which may be of the "hexadecimal" type.

Interconnection with the system under test is made via a series of pins, or "Control I/O Ports" 17, which correspond in number and physical arrangement with the pins of the microprocessor in the system under test. In operation, that processor is removed from the system under test, and Control I/O Ports 17 connected in its stead, preferably through a connecting cable 18.

The operating system for the SST is stored in a system ROM (read-only memory) 19 which may be e.g., an Intel 2708 EPROM. The information stored in ROM 19 directs the action of internal microprocessor 11 in communicating with keyboard 13, display 15, and Control I/O Port 17. A system RAM 21, such as an Intel 2114, provides temporary storage of data for use by internal microprocessor 11. RAM 21 is also used to store temporary programs that are entered as keystrokes on keyboard 13 in a manner similar to that employed in programmable calculators.

Figure 2:
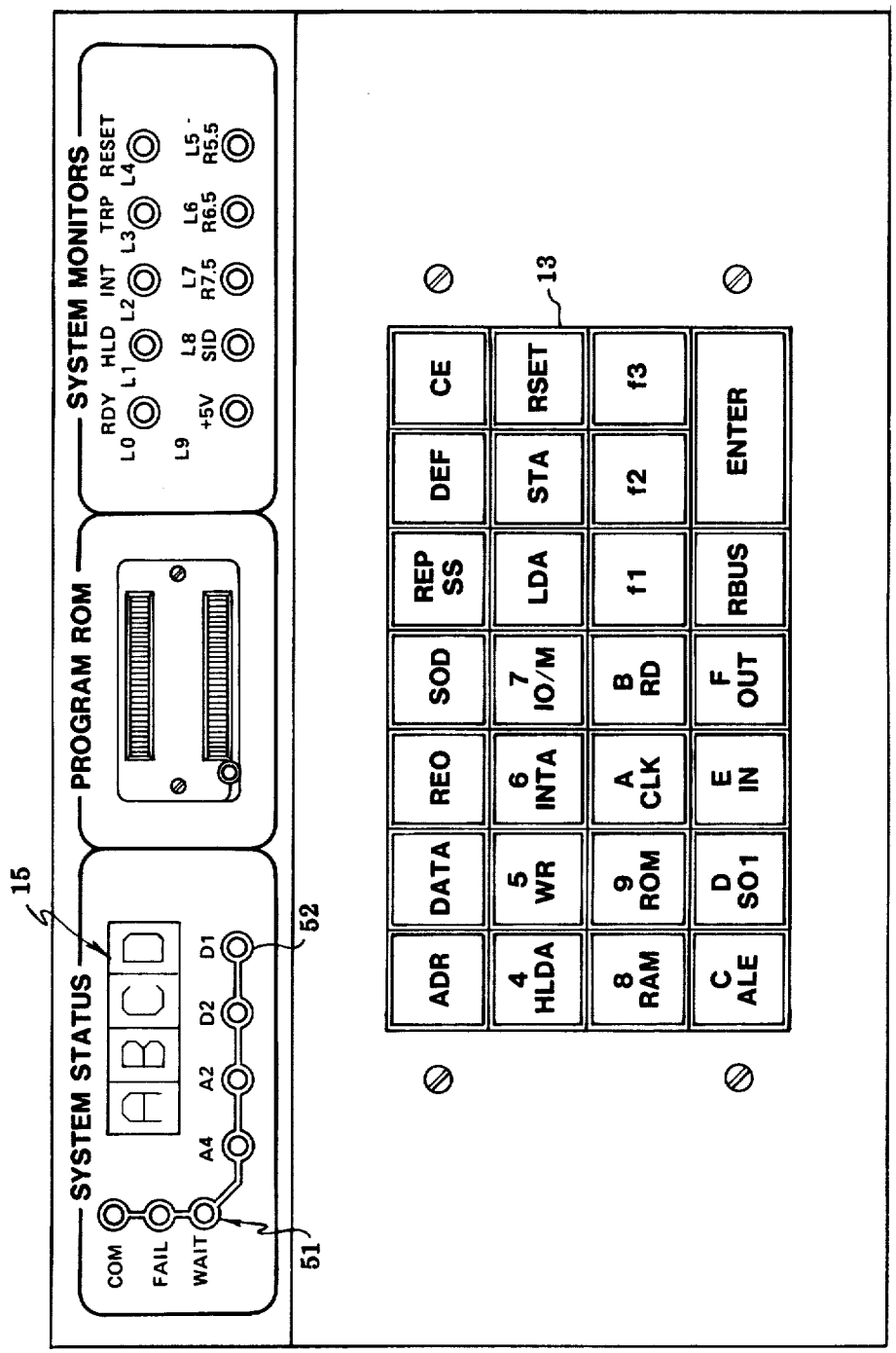
FIG. 2 is a view of the front panel, of the static stimulus tester, including keyboard and display.

Referring now specifically to FIG. 2, there is shown, in more detail, a keyboard 13 which is specifically adapted for testing systems involving the Intel 8085 microprocessor. The keyboard will have a different set of keys if the SST is to replace a different microprocessor in the system under test, the arrangement of which will be evident to those skilled in the art after reading the totality of the present specification.

Figure 3:
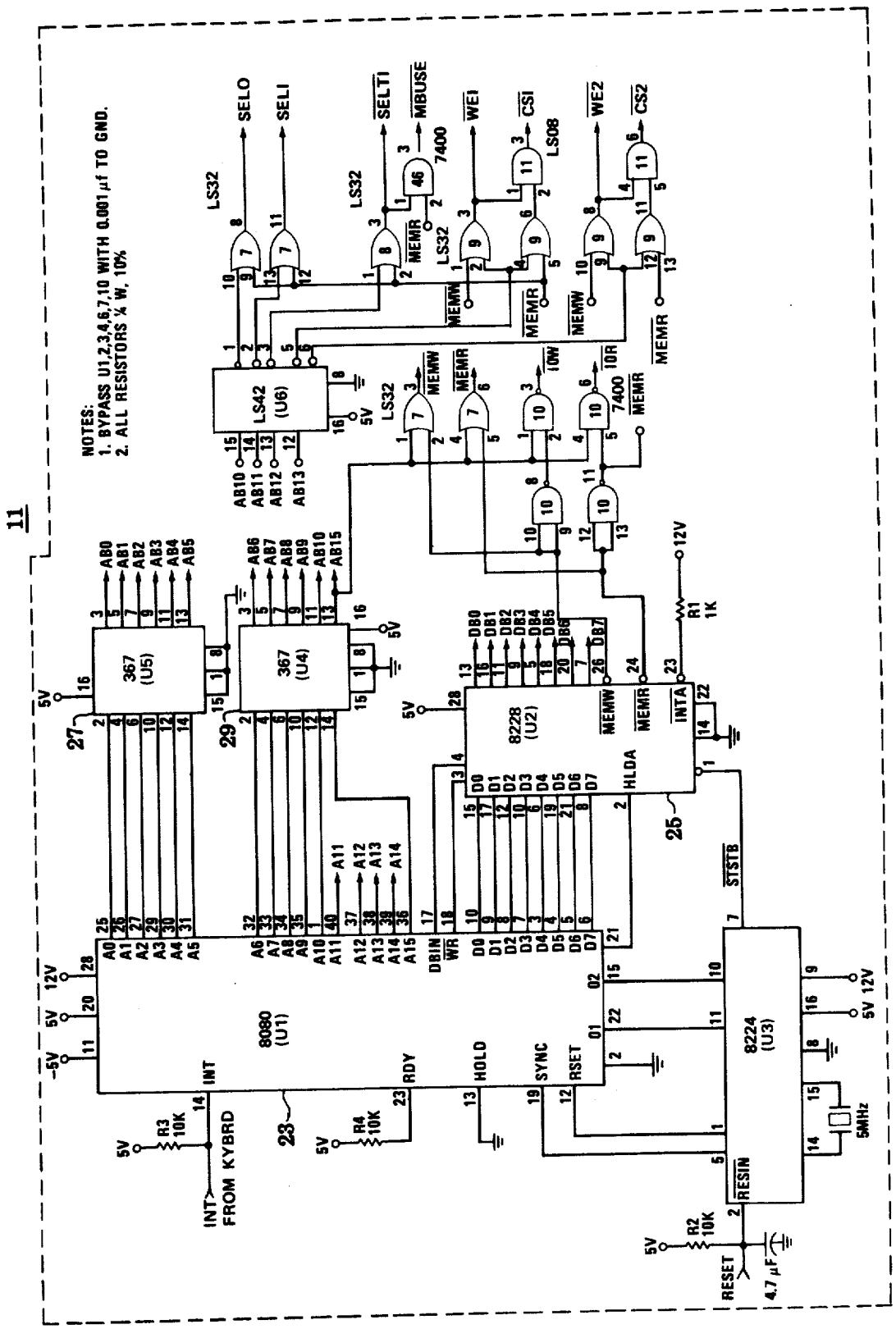
FIG. 3 is a schematic diagram of the controlling microprocessor used in the SST.

In FIG. 3, microprocessor 11 is shown in more detail including a microprocessor chip 23, an 8228 system controller 25, and a pair of 74LS367 address bus buffers 27 and 29. A number of logic gates are also included to provide the correct chip select and write enable signals to the SST system.

Figure 4:
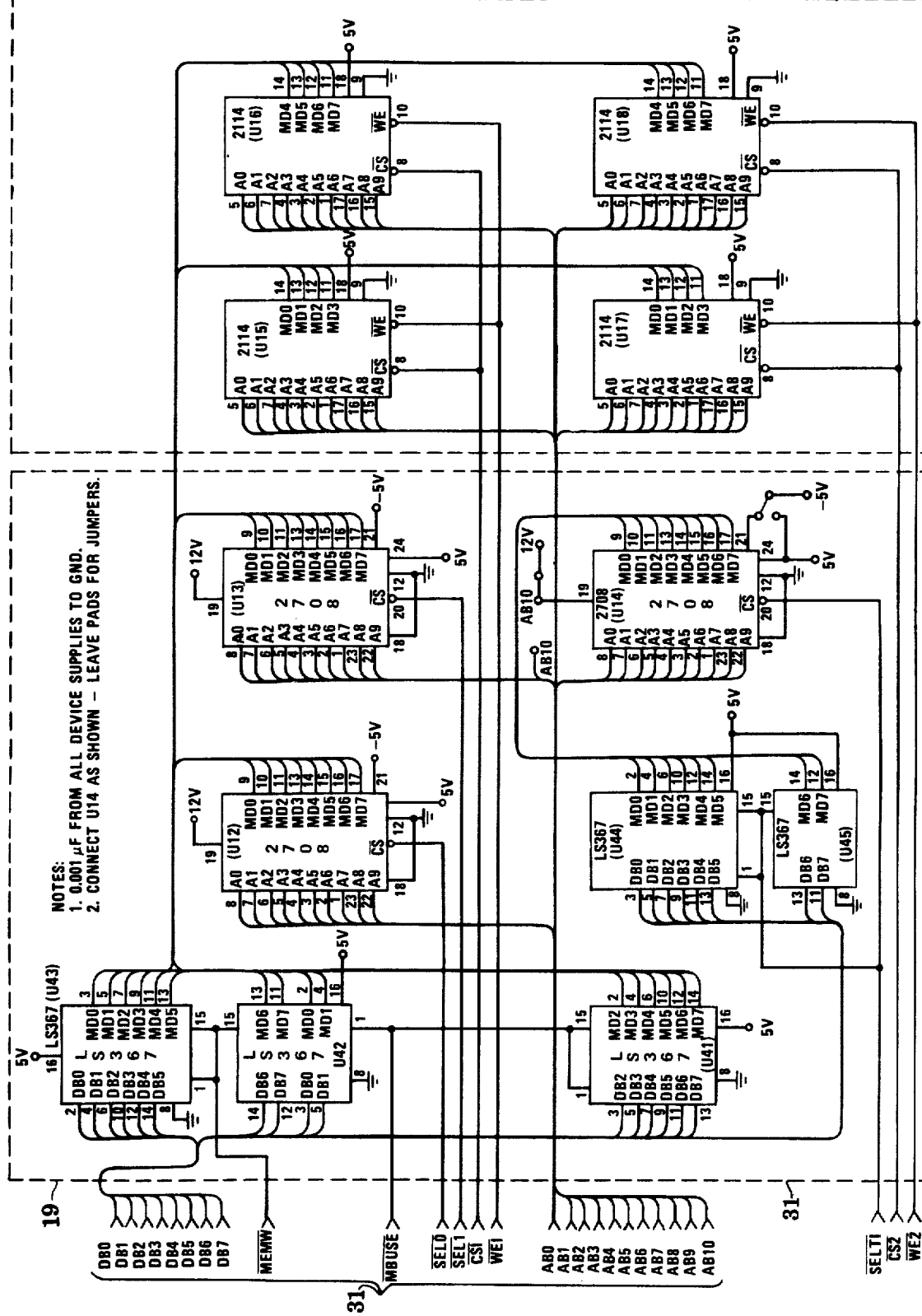
FIG. 4 is a schematic diagram of a ROM and a RAM used in the SST.

ROM 19 and RAM 21 are shown in more detail in FIG. 4 including the particular interconnections 31 between processor 11 and the various 2708 ROM chips.

Figure 5:
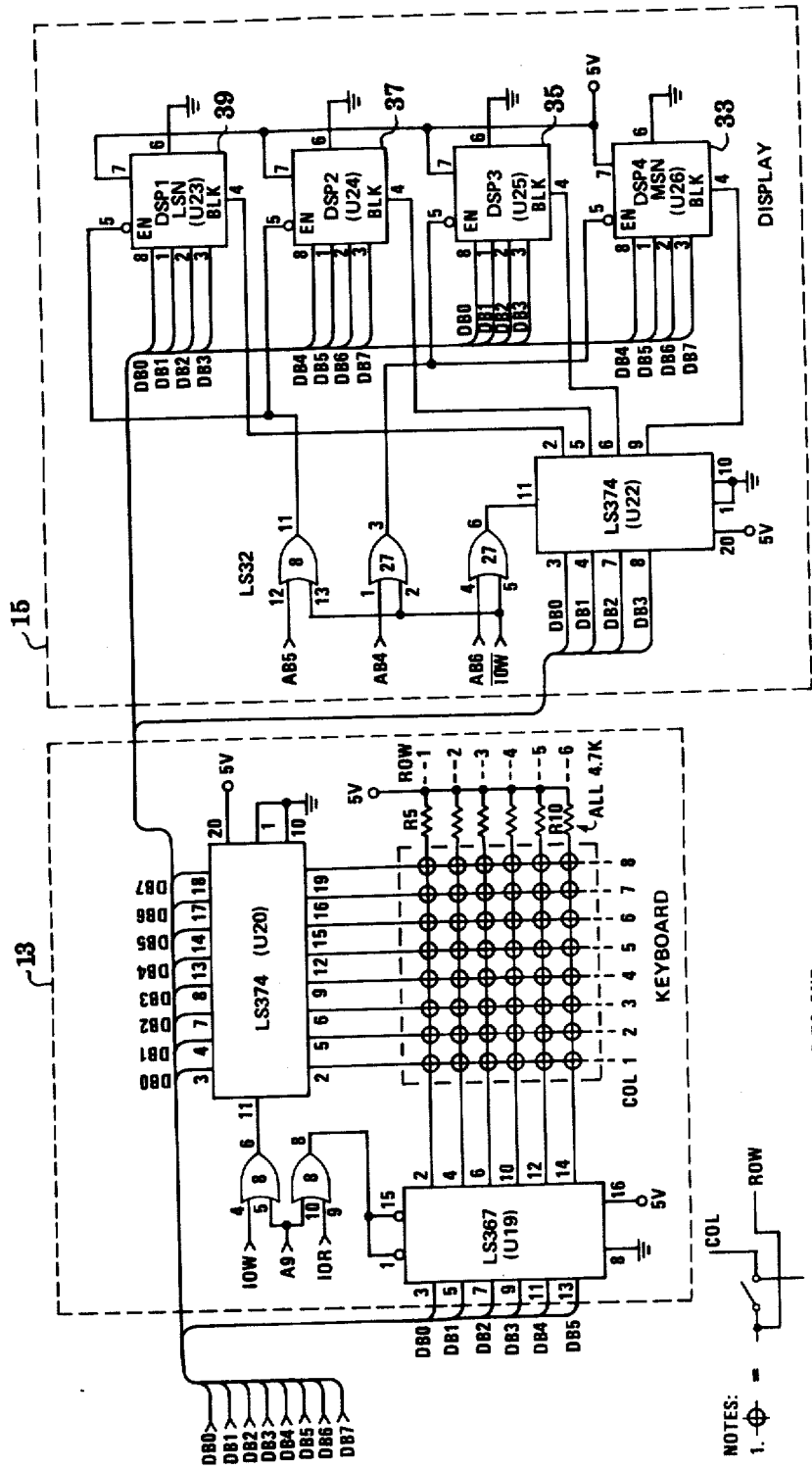
FIG. 5 is a schematic diagram of the keyboard and a part of the display of the SST.

In FIG. 5 are shown keyboard 13 and display 15 which includes four alphanumeric display elements 33, 35, 37 and 39 of the HP 5082-7340 type, available from Hewlett-Packard Company, Palo Alto, Calif.

Figure 6:
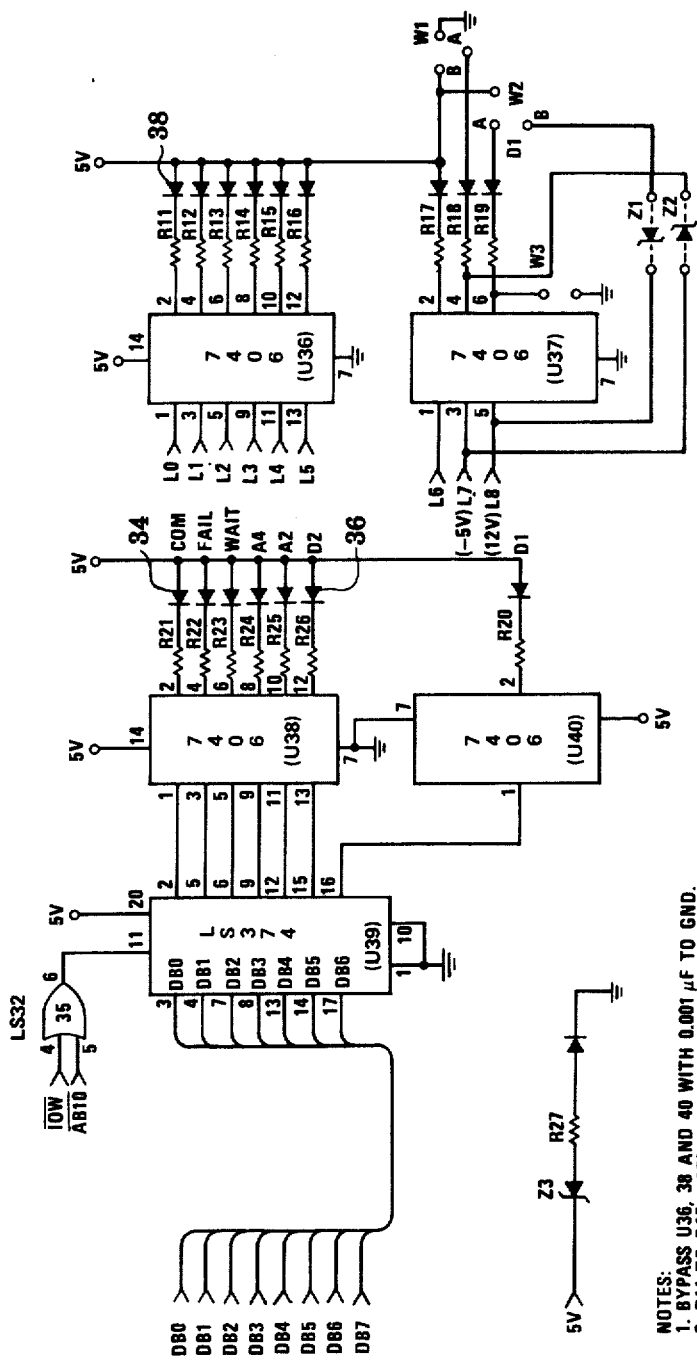
FIG. 6 is a schematic diagram of additional sections of the display for the SST.

FIG. 6 shows additional indicators used as part of display 15 such as a number of LED's 34, 36, and 38, used to prompt the user as the SST executes functions in normal system operation.

Figure 7:
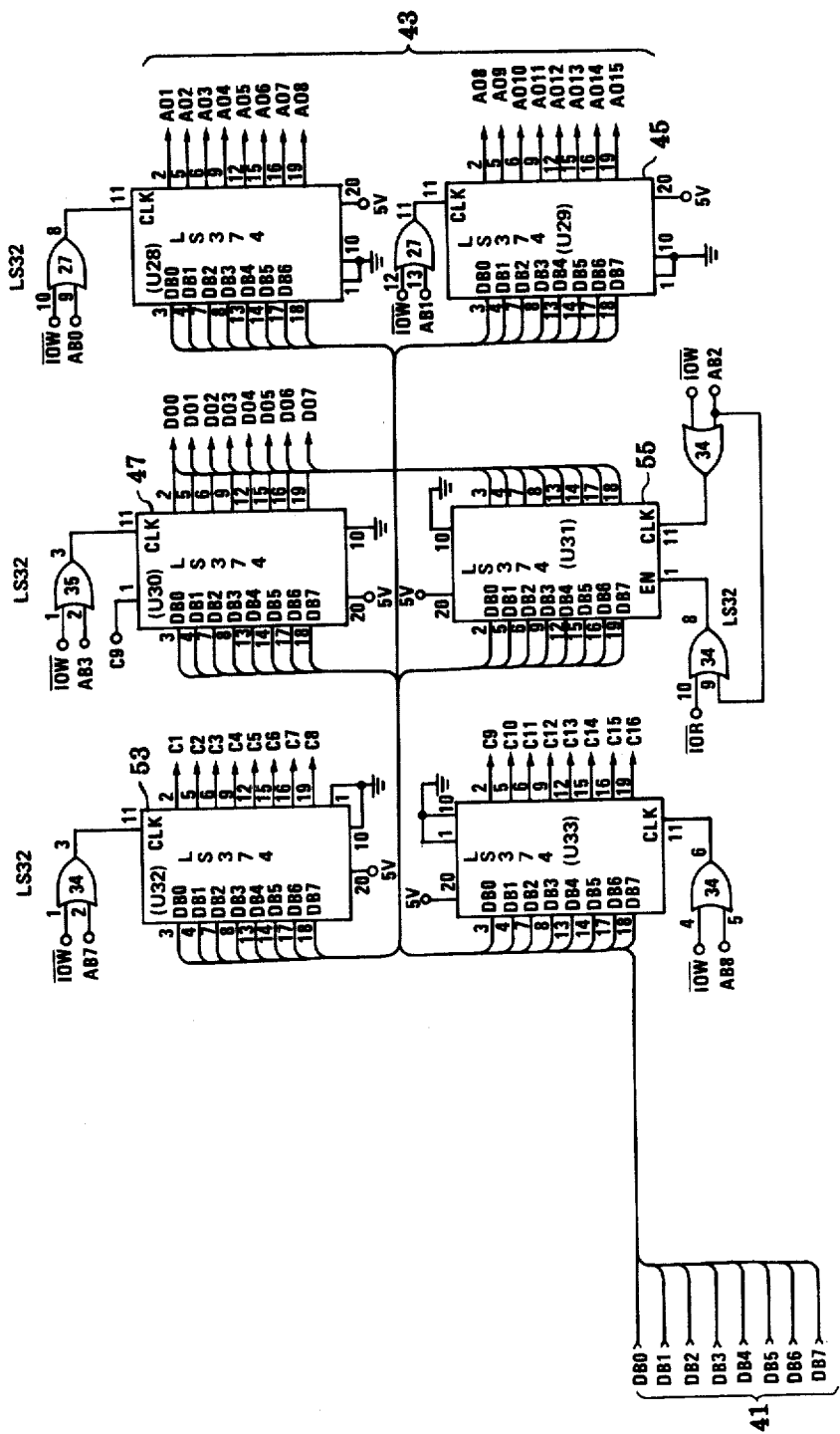
FIG. 7 is a schematic diagram of the I/O interface bus of the SST which connects the SST to the system under test.

FIG. 7 shows Control I/O Port 17, including interconnections 41 to/from processor 11, and interconnects cable 43 to/from the system under test.

The invention will be best understood by means of an operational example. In particular, it will be assumed that the system to be tested involves the Intel 8085 microprocessor, which is to be replaced by the SST for system test purposes. As noted above, the keyboard of FIG. 2 is appropriate for such a system, and the different labels of that keyboard will be referred to in this example. In this particular example, the SST will be used to read data from the ROM or RAM of the system under test. To understand how the SST performs this function, it is helpful to know how the 8085 microprocessor, itself, executes this function. This information is known by those skilled in the art, but will be summarized here for completeness. To read data from memory, the 8085 microprocessor executes the following general sequence of events. All terms refer to I/O pins of the 8085 itself:

(1) System address is set to the location of memory to be read.

(1a) A15–A8 the upper address byte is set.

(1b) A7–A0 are set on the data lines of the 8085 microprocessor.

(2) The ALE bit is set to a logical 1.

(3) The ALE bit is set to a logical 0. (With the ALE returning to a logical 0, the lower byte of address is latched into the address latch in an 8085 system.)

(4) I/O memory line (IO/$\overline{M}$) is set to a logical 0 indicating a memory operation.

(5) $\overline{RD}$ signal is set to a logical 0.

At this point, data from the address location of memory is on the system data bus. The 8085 microprocessor strobes this data into an internal register.

Figure 1:
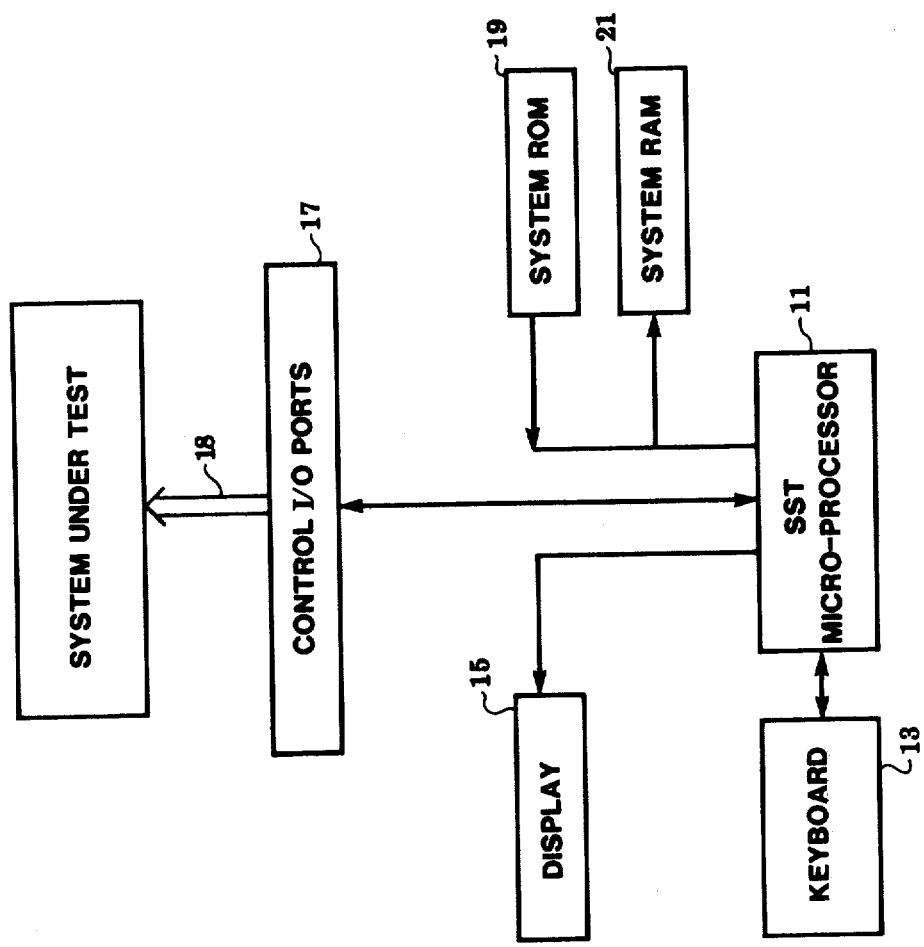
FIG. 1 is a block diagram of a statis stimulus tester (SST).

To perform this same general function with the SST, the following sequence of events are performed:

(1) The user removes the 8085 microprocessor from the system under test and installs SST cable 18 of FIG. 1 into the vacated socket.

(2) The user presses the key labeled ADR on SST keyboard 13. The SST will respond by blanking display 15, and turning on a light-emitting diode (LED) to indicate that four address nibbles are required before proceeding. These four nibbles will uniquely define a 16-bit address.

(3) The user now enters four digits via the keyboard. For example, the user may enter the hexadecimal numbers A B C D.

(4) The user now presses the key labeled ENTER, whereupon the following occurs: the 16 bits defined by the word ABCD are set to the proper control output ports; the 8-bit word AB is strobed into a latch 45 while the 8-bit word CD will be set into another latch 47. The SST now turns on an indicator LED 49 (labeled "COM" in FIG. 2) and waits for another user input. This completes the first step in the electrical sequence to read data from memory; namely, set the system address bus. When the ENTER key is pressed, the SST will automatically take the ALE line to a logical 1 and the ALE line to a logical 0. This will latch the CD address that was on the data bus into the address latch of the system under test (the address latch must be present in any 8085 microprocessor system). Thus, at this point, the address is effectively presented to the system memory. It can be noted that the address is set statically on the address bus of the system under test, so that the user can electrically verify the logic conditions of the address bus line using Direct Current or Static measurement techniques.

(5) The next operation the user will perform is to press the key labeled IO/$\overline{M}$. When the user presses this key, the SST will light another indicator LED 51, 52 (labeled "WAIT" and "D1" in FIG. 2), an indication to the user that one digit must be entered. The SST is waiting for a 0 or 1 to be entered via the keyboard. The user will press the key labeled 0 and next press the ENTER key. When these two operations are complete, the IO/$\overline{M}$ line output from the 8085 microprocessor is now set to a logical 0 indicating a memory operation to be performed. Next, the user will press the key labeled RD. The SST will wait for a 1 or 0 to be entered. The RD control bit C2 of latch 53 (FIG. 7) is set to a logical 0. This action will set the RD signal of the system under test to a logical 0.

After this step is complete, the data from the system under test of the designated memory location should be present on the data bus of that system. To read the data bus with the SST, the user presses the key labeled RBUS. When this key is pressed, the following will occur:

(1) IC 47 of FIG. 7 is disabled.

(2) IC 55 of FIG. 7 is clocked by SST processor 11 of FIG. 1.

(3) Processor 11 on the SST reads the data clocked into IC 55 (this being the data that was present on the data bus of the system under test.)

(4) Processor 11 will write the data read from IC 55 to the SST display 15. In this way, the user can visually verify the logical condition of each bit on the data bus of the system under test.

The above-described "MEMORY READ" function is performed in response to user activation of a particular set of keys on the keyboard. Other functions are activated by different keys to be described immediately below. Upon activation of a key, processor 11 interrogates a "Command Jump Table" in ROM 19 to locate the ROM address of the routine corresponding to the key-defined function. Processor 11 then executes this function routine and any other routine which is called in the process of executing the function routine.

For a system under test in which the microprocessor is an 8085 by Intel Corp., the program listing of the "Command Jump Table" and the routines required to execute the keyboard commands is included herein as Appendix "A". The SST operation resulting from this preferred keyboard and set of programs is summarized below where reference is made to the key labels (which are identical to the labels in the "Command Jump Table," unless otherwise noted.

ADR

The ADR key, or address key, will put the SST into a mode where it is waiting for the user to enter 4 hexadecimal digits to be used as a 16 bit address for the microprocessor system under test.

DATA

The DATA key puts the SST into a mode where the microprocessor is waiting for the user to enter two hexadecimal digits to be used as 8 bits of data to be placed on the data bus of the system under test.

REO

The REO is short for Reset Output. When this key is pressed the SST will wait for the user to enter a logical 1 or a logical 0 on the keyboard, to be placed on the reset output line.

SOD

This is the abbreviation for Serial Data Output. When this key is pushed the SST will wait for the user to enter a logical 1 or a logical 0 very similar to the reset out function.

REP

This is the abbreviation for REPEAT. When the REPEAT key is pushed, the SST will repeatedly re-execute the last key entered, prior to the REPEAT key.

DEF

This is the abbreviation for DEFINED FUNCTION. This key is pushed to define a function, e.g., when the user desires to write his own program for the SST. The program itself is entered via keystrokes, much as the programs are entered into a programmable calculator.

CE

The abbreviation is short for CLEAR ENTRY, which clears the keyboard and awaits new data to be entered.

HLDA

This is the abbreviation for HOLD ACKNOWLEDGE. When this key is pushed the SST goes into a mode awaiting entry of a 1 or a 0, to be placed on the hold acknowledge line.

WR

This is the abbreviation for WRITE. When this key is hit the SST will wait for the user to enter a 1 or a 0, to be placed on the write enable output line.

INTA

This is an abbreviation for INTERRUPT ACKNOWLEDGE. When this key is hit the SST will await entry of a 1 or a 0, to be placed on the interrupt acknowledge line.

IO/M (referred to as IO&M in the listing)

This is an abbreviation for the I/O, or Memory line. When this key is hit the SST goes into a mode waiting for the user to enter a 1 or a 0, to be placed on the I/O or memory output line.

LDA

This is the abbreviation for LOAD A REGISTER WITH MEMORY DATA. When this key is pressed the SST will go into a mode awaiting entry of 4 hexadecimal digits to be entered as the address. After the 4 digits have been entered the SST will automatically control all the bits necessary to read data back from memory at the address specified.

STA

This is the abbreviation for STORE A REGISTER INTO MEMORY. When this key is pressed the SST will await entry of 4 hexadecimal digits specifying a unique memory address. After the address is entered the SST will then wait for two more hexadecimal digits to be specified, as data to be written to the unique memory address. After this data has been entered, the SST will automatically perform all the necessary control to write those 8 bits of data into the memory of the system under test.

RESET

This is the abbreviation for RESET. When this key is pressed the SST will execute the internal program which is the same program executed when power is first turned on to the system.

RAM

This is the abbreviation for RANDOM ACCESS MEMORY TEST. When this key is pressed the SST awaits entry of 4 hexadecimal digits to be entered to specify a starting address for the test to be run. After the starting address is entered, the SST will then wait for 4 more hexadecimal digits to specify an ending address. When the ending address has been entered the SST will automatically perform a functional test on the system RAM between the address limits that were specified.

ROM

This is the abbreviation for READ ONLY MEMORY TEST. When this key is pressed the SST will go into a mode waiting for 4 hexadecimal digits to be entered. These hexadecimal digits are a starting address for the ROM test to be run. After the 4 digits have been entered the SST will automatically compare a test ROM plugged into the SST front panel against the ROM of the system under test specified at the starting address the user entered.

CLK

This is the abbreviation for CLOCK. When this key is pressed the SST will wait for a 1 or a 0 to be entered, to be outputed on the clock line.

RD

This is the abbreviation for the READ LINE. When this key is pressed the SST will wait for a 1 or a 0 to be entered. The 1 or 0 will be outputed on the read line.

F1, F2, F3

These three are user definable functions. When this key is pressed the SST will go into a mode waiting for the user to enter in a series of keystrokes to be executed as a program. After the keystrokes have been entered, the keystrokes corresponding to any of the keys labeled F1, F2 or F3 will be executed each time the user presses that key.

ALE

This is the abbreviation for ADDRESS LATCH ENABLE. When this key is pressed the SST will go into a mode waiting for a logical 1 or a logical 0 to be entered, to be outputed on the address latch enable line.

S01

This is the abbreviation for the STATUS 0 and 1 LINES on the 8085 microprocessor. When this key is pressed the SST will go into a mode waiting for any number 0, 1, 2, or 3 to be entered, which will be outputed on the two lines 0 and 1.

IN

This is the abbreviation for INPUT DATA to the accumulator. When this key is pressed the SST will await entry of two hexadecimal digits which specify an address of an input port. After the address has been specified by the user, the SST will automatically perform all the control necessary to execute an input instruction. The data from the input port specified will be displayed on the SST.

OUT

This is the abbreviation for OUTPUT ACCUMULATOR TO OUTPUT PORT. When this key is pressed the SST will await entry of two hexadecimal digits. These hexadecimal digits will specify the address of the output port. After the address has been entered the SST will then wait for the user to enter two more digits which will specify 8 bits of data to be written to the specified output port. After the data has been entered the SST will execute all the control necessary to write the data to the output port specified.

RBUS

This is the abbreviation for READ DATA BUS. When this key is pressed the SST will automatically strobe the data on the system data bus, and display the data on the 4 digit display located on the front panel of the SST.

ENTER (referred to as ENTR in the listing)

This is an abbreviation for ENTER DATA. When this key is pressed the data that is displayed on the SST 4 digit display will be entered into the SST and used as data for the command being executed.

APPENDIX "A"

```
22 0000    ------------------------------------------------------------
23 0000    *
24 0000    * GLOBAL SYSTEM EQUATES
25 0000    *
26 0000    ************************************************************
27 0000    *
28 0000    *
29 0000    STACK  EQU 1190H       STACK ADDRESS (200 DEEP)
30 0000    VARAB  EQU STACK+1
31 0000    *
32 0000    * SST ADDRESSES
33 0000    *
34 0000    AADRL  EQU 0FFFEH      ADDRESS LOW BYTE (NOT USED)
35 0000    AADRH  EQU 0FFFDH      ADDRESS HIGH BYTE
36 0000    ADATI  EQU 0FFF8H      DATA INPUT
37 0000    ADATO  EQU 0FFF7H      DATA OUTPUT, ADDRESS LOW
38 0000    AMSB   EQU 0FFEFH      DISPALY MSB
39 0000    ALSB   EQU 0FFDFH      DISPLAY LSB
40 0000    ADISP  EQU 0FFBFH      DISPLAY CONTROL
41 0000    ACNT1  EQU 0FF7FH      CONTROL BYTE ONE
42 0000    ACNT2  EQU 0FEFFH      CONTROL BYTE TWO
43 0000    AKYBD  EQU 0FDFFH      KEYBOARD
44 0000    ASTAT  EQU 0FBFFH      STATUS LIGHTS
45 0000    *
46 0000    * NUMBER OF MEMORY PORTS
47 0000    *
48 0000    NUMA   EQU 11
49 0000    *
50 0000    * LIGHT STATUS EQUATES
51 0000    *
52 0000    SCMD   EQU 1           COMMAND
53 0000    SFAIL  EQU 2           FAIL
54 0000    SD1    EQU 104B        D1 + WAIT
55 0000    SD2    EQU 44B         D2 + WAIT
56 0000    SA2    EQU 24B         A2 + WAIT
57 0000    SA4    EQU 14B         A4 + WAIT
58 0000    *
59 0000    * CONTROL BIT MASK DEFINITIONS
60 0000    *
61 0000    * CNT1 BITS
62 0000    *
63 0000    MS0    EQU 0
64 0000    MS1    EQU 1
65 0000    MSOD   EQU 2
66 0000    MALE   EQU 3
67 0000    MREO   EQU 4
68 0000    MIDSM  EQU 5
69 0000    MWR    EQU 6
70 0000    MRD    EQU 7
71 0000    *
72 0000    * CNT2 BITS
73 0000    *
74 0000    MDBUS  EQU 128
75 0000    MINTA  EQU 129
76 0000    MHLDA  EQU 130
77 0000    MCLK   EQU 131
78 0000    *
79 0000    * MISC. EQUATES
```

```
80 0000         *
81 0000         KTIME EQU 100          NUMBER OF DEBOUNCE LOOPS
82 0000         NINIT EQU 14           NUMBER OF INITAILIZE BYTES
83 0000         *
84 0000         *   KEY CODES
85 0000         *
86 0000         CREP  EQU 5
87 0000         CDEF  EQU 6
88 0000         CLDA  EQU 12
89 0000         CF1   EQU 19
90 0000         CF2   EQU 20
91 0000         CF3   EQU 21
92 0000         *
93 0000         *
94 0000         ***********************************************************
95 0000         *                                                          *
96 0000         *   VARIABLES                                              *
97 0000         *                                                          *
98 0000         ***********************************************************
99 0000         *
100 0000        *
101 1191              ORG VARAB
102 1191 00     PKEY  DB 0             PREVIOUS KEY VALUE
103 1192 00     LKEY  DB 0             SAVED KEY VALUE
104 1193 00     REG1  DB 0             GP REGISTER
105 1194 00 00  LPNTR DW 0             LOOP COMMAND POINTER
106 1196 00 00  L2    DW 0             CFUN POINTER
107 1198        *
108 1198        *   INITAILIZE REQUIRED VARAIBLES
109 1198        *
110 1198 00     SMASK DB 0             SAVED SCAN MASK
111 1199 00     KMODE DB 0             KEYBOARD MODE FLAG
112 119A FF     RMODE DB 0FFH          REPEAT FLAG
113 119B        *
114 119B        *   OUTPUT DATA BUFFER
115 119B        *
116 119B 00     OADRL DB 0             ADDRESS LOW
117 119C 00     OADRH DB 0             ADDRESS HIGH
118 119D 00     IDATA DB 0             DATA IN
119 119E 00     ODATA DB 0             DATA OUT
120 119F 00     OMSB  DB 0             MSB OF HEX DISPLAY
121 11A0 00     OLSB  DB 0             LSB OF HEX DISPLAY
122 11A1 00     ODISP DB 0             DISPLAY CONTROL
123 11A2 00     OCNT1 DB 0             CONTROL BYTE ONE
124 11A3 00     OCNT2 DB 0             CONTROL BYTE TWO
125 11A4 00     OKYBD DB 0             KEYBOARD
126 11A5 00     OSTAT DB 0             STATUS LIGHTS
127 11A6        *
128 11A6        *   FUNCTION KEY DEFINITION AREA
129 11A6        *
130 11A6        KF1   DS 200
131 126E        KF2   DS 200
132 1336        KF3   DS 200
133 13FE        *
134 13FE        *
135 13FE        ***********************************************************
136 13FE        *                                                          *
137 13FE        *   POWER FAIL, RESET ROUTINE                              *
138 13FE        *                                                          *
139 13FE        ***********************************************************
140 13FE        *
141 13FE        *
142 0000              ORG 0000H
143 0000 31 90 11 RESET LXI SP,STACK   GET STACK POINTER
144 0003 21 56 00    LXI H,OINIT       GET INIT ADDRESS
145 0006 11 98 11    LXI D,SMASK       GET BUFFER ADDRESS
146 0009 0E 0E       MVI C,NINIT       LENGTH
147 000B CD A3 03    CALL MVAR         MOVE IT
148 000E 3E 06       MVI A,CDEF        RESET FUNCTION KEYS
```

```
149 0010 32 A6 11        STA KF1
150 0013 32 6E 12        STA KF2
151 0016 32 36 13        STA KF3
152 0019 CD 80 03        CALL DOUT     UPDATE
153 001C CD CA 00        CALL SALE     STROBE ZERO ADDRESS
154 001F FB              EI            ENABLE INTERRUPTS
155 0020 C3 72 00        JMP CMD       WAIT FOR COMMAND
156 0023         *
157 0023         *  USE THIS ROM SPACE (21 BYTES)
158 0023         *
159 0023         *
160 0023         *  THIS GUY CLEARS A SINGLE CONTROL BIT AS PER A REG MASK
161 0023         *
162 0023 06 00   CLR     MVI B,0       GET DATA
163 0025 CD 3B 03 CLR2   CALL DBIT     CLEAR BIT
164 0028 C3 31 00        JMP CRST2     REUSE CRST CODE
165 002B         *
166 002B         *  THIS GUY RESET BOTH CONTROL WORDS
167 002B         *  TO THEIR INITAIL CONDITIONS
168 002B         *
169 002B 2A 68 00 CRST   LHLD SINT     CONTROL RESET
170 002E 22 A2 11        SHLD OCNT1
171 0031 CD 80 03 CRST2  CALL DOUT
172 0034 C9              RET
173 0035         *
174 0035         *
175 0035         ***************************************************************
176 0035         *                                                              *
177 0035         *  CLEAR ENTRY, RESET 7 ROUTINE                                *
178 0035         *                                                              *
179 0035         ***************************************************************
180 0035         *
181 0035         *
182 0038                 ORG 38H
183 0038         *
184 0038         *  CHECK REPEAT KEY MODE
185 0038         *
186 0038 F5      RST7    PUSH PSW      SAVE PROC STAT
187 0039 3A 9A 11        LDA RMODE     REPEAT MODE ?
188 003C FA 47 00        JM RST7B      NO
189 003F 3E FF           MVI A,0FFH    YES, CLEAR IT
190 0041 32 9A 11        STA RMODE
191 0044 F1             POP PSW        RESTORE PROC STAT
192 0045 FB             EI
193 0046 C9             RET
194 0047         *
195 0047         *  NORMAL CLEAR ENTRY
196 0047         *
197 0047 31 90 11 RST7B  LXI SP,STACK   RESET STACK
198 004A 3E 0F           MVI A,0FH      BLANK DISPLAY
199 004C 32 A1 11        STA ODISP
200 004F CD 80 03        CALL DOUT
201 0052 FB              EI             ENABLE INTERRUPTS
202 0053 C3 72 00        JMP CMD        WAIT FOR COMMAND
203 0056         *
204 0056         *
205 0056         ***************************************************************
206 0056         *
207 0056         *  CONSTANTS
208 0056         *
209 0056         ***************************************************************
210 0056         *
211 0056         *
212 0056         *
213 0056         *  VARIABLE INITAIL CONDITION VALUES
214 0056         *
215 0056 00      OINIT   DB 0          SAVE MASK
216 0057 00              DB 0          KMODE=LOCAL
217 0058 FF              DB 0FFH       DISABLE REPEAT KEY
```

```
218 0059 00                     DB 0              ADDRESS LOW
219 005A 00                     DB 0              ADDRESS HIGH
220 005B 00                     DB 0              DATA IN  (MEANINGLESS WRITE)
221 005C 00                     DB 0              DATA OUT
222 005D 80                     DB 080H           MSB OF HEX DISPLAY
223 005E 85                     DB 085H           LSB OF HEX DISPLAY
224 005F 00                     DB 0              DISPLAY CONTROL
225 0060 C3         SINT        DB 0C3H           CONTROL BYTE ONE
226 0061 00         SINT2       DB 0              CONTROL BYTE TWO
227 0062 00                     DB 0              KEYBOARD
228 0063 01                     DB 1              STATUS LIGHTS
229 0064             *
230 0064             *  CFUN ARRAYS
231 0064             *
232 0064 EA         SIN         DB 0EAH           READ STATUS
233 0065 E2                     DB 0E2H           ALE STROBE
234 0066 62                     DB 062H           READ I/O
235 0067             *
236 0067 E9         SOUT        DB 0E9H           WRITE STATUS
237 0068 E1                     DB 0E1H           ALE STROBE
238 0069 A1         SOUT2       DB 0A1H           WRITE I/O
239 006A C3                     DB 0C3H           RESET
240 006B             *
241 006B CA         SLDA        DB 0CAH           READ STATUS
242 006C C2                     DB 0C2H           ALE STROBE
243 006D 42                     DB 042H           READ MEMORY
244 006E             *
245 006E C9         SSTA        DB 0C9H           WRITE STATUS
246 006F C1                     DB 0C1H           ALE STROBE
247 0070 81         SSTA2       DB 081H           WRITE MEMORY
248 0071 C3                     DB 0C3H           RESET
249 0072             *
250 0072             *
251 0072             ****************************************************
252 0072             *                                                   *
253 0072             *  COMMAND ENTRY STATE                              *
254 0072             *                                                   *
255 0072             ****************************************************
256 0072             *
257 0072             *
258 0072             *
259 0072             *  SET COMMAND STATUS IN LITES
260 0072             *
261 0072 3E 01       CMD         MVI  A,SCMD       GET COMMAND STATUS
262 0074 32 A5 11                STA  OSTAT        SAVE IN BUFFER
263 0077 CD 80 03                CALL DOUT
264 007A CD E1 02                CALL RKEY         WAIT FOR KEY DOWN
265 007D 3D                      DCR  A            MAKE 0 TO N-1
266 007E 07                      RLC               TIMES 2
267 007F 21 8E 00                LXI  H,JMTAB      GET JUMP TABLE BASE
268 0082 CD 2D 02                CALL ADAHL        ADD TO HL
269 0085 5E                      MOV  E,M          GET ADDRESS
270 0086 23                      INX  H            NEXT BYTE
271 0087 56                      MOV  D,M
272 0088 21 72 00                LXI  H,CMD        GET RETURN ADDRESS
273 008B EB                      XCHG              PLACE IN HL
274 008C D5                      PUSH D            PUT RETURN IN STACK
275 008D E9                      PCHL              JMP INDIRECT
276 008E             *
277 008E             *  COMMAND JUMP TABLE
278 008E             *
279 008E C4 00       JMTAB       DW   ADR          0-ADDRESS
280 0090 D5 00                   DW   DATA         1-DATA
281 0092 DC 00                   DW   REO          2-RESET OUT
282 0094 E1 00                   DW   SOD          3-SERIAL DATA OUT
283 0096 EE 01                   DW   REP          4-REPEAT
284 0098 5B 01                   DW   DEF          5-DEFINE FUNCTION
285 009A 0F 01                   DW   CE           6-CLEAR ENTRY, RST 7
286 009C 10 01                   DW   HLDA         7-HOLD ACKNOWLEDGE
287 009E 15 01                   DW   WR           8-WRITE
```

```
288 00A0 1A 01            DW    INTA       9-INTERRUPT ACKNOWLEDGE
289 00A2 1F 01            DW    IOEM       10-IO OR MEMORY
290 00A4 24 01            DW    LDA        11-LOAD A REGISTER
291 00A6 37 01            DW    STA        12-STORE A REGISTER
292 00A8 4D 01            DW    RSET       13-RESET
293 00AA 4E 01            DW    RAM        14-RAM TEST
294 00AC 4F 01            DW    ROM        15-ROM TEST
295 00AE E9 01            DW    CLK        16-CLOCK
296 00B0 B0 01            DW    RD         17-READ
297 00B2 B5 01            DW    F1         18-FUNCTION 1
298 00B4 BB 01            DW    F2         19-FUNCTION 2
299 00B6 C1 01            DW    F3         20-FUNCTION 3
300 00B8 C7 01            DW    ALE        21-ADDRESS LATCH ENABLE
301 00BA CC 01            DW    S01        22-STATUS LINES
302 00BC E6 00            DW    IN         23-INPUT
303 00BE F9 00            DW    OUT        24-OUTPUT
304 00C0 F5 01            DW    RBUS       25-READ BUS
305 00C2 B6 02            DW    ENTR       26-ENTER DATA
306 00C4            *
307 00C4            ************************************************
308 00C4            *
309 00C4            *     COMMAND CODE
310 00C4            *
311 00C4            ************************************************
312 00C4            *
313 00C4            *     ADDRESS REQUEST
314 00C4            *
315 00C4 CD 69 02 ADR     CALL GA4         GET 4 NIBBLE ADDRESS
316 00C7 CD 80 03         CALL DOUT        UPDATE
317 00CA 3E 03   SALE     MVI  A,MALE      STROBE ALE ONLY
318 00CC CD 7B 03         CALL SET
319 00CF 3E 03            MVI  A,MALE
320 00D1 CD 23 00         CALL CLR
321 00D4 C9               RET
322 00D5            *
323 00D5            *     DATA REQUEST
324 00D5            *
325 00D5 CD 3E 02 DATA    CALL GD2         GET 2 NIBBLE DATA
326 00D8 CD 80 03         CALL DOUT        UPDATE
327 00DB C9               RET
328 00DC            *
329 00DC            *     RESET OUTPUT
330 00DC            *
331 00DC 3E 04   RED      MVI  A,MRED      GET MASK
332 00DE C3 14 02         JMP  DOBIT
333 00E1            *
334 00E1            *     SERIAL DATA OUT
335 00E1            *
336 00E1 3E 02   SOD      MVI  A,MSOD      GET MASK
337 00E3 C3 14 02         JMP  DOBIT
338 00E6            *
339 00E6            *     INPUT
340 00E6            *
341 00E6 CD 2B 00 IN      CALL CRST        CONTROL RESET
342 00E9 CD 40 02         CALL GA2         GET PORT ADDRESS
343 00EC 21 64 00         LXI  H,SIN       CONTROL FUNCTIONS
344 00EF CD 62 03         CALL CFUN3
345 00F2 CD F5 01         CALL RBUS        READ THE BUS
346 00F5 CD 2B 00         CALL CRST        CONTROL RESET
347 00F8 C9               RET              DONE
348 00F9            *
349 00F9            *     OUTPUT
350 00F9            *
351 00F9 CD 2B 00 OUT     CALL CRST        CONTROL RESET
352 00FC CD 40 02         CALL GA2         GET PORT ADDRESS
353 00FF 21 67 00         LXI  H,SOUT      CONTROL FUNCTIONS
354 0102 CD 65 03         CALL CFUN2
355 0105 CD 3E 02         CALL GD2         GET DATA
356 0108 21 69 00         LXI  H,SOUT2     CONTROL FUNCTIONS
```

```
357 010B CD 65 03          CALL CFUN2
358 010E C9                RET            DONE
359 010F           *
360 010F           *  CLEAR ENTRY
361 010F           *
362 010F C9        CE   RET
363 0110           *
364 0110           *  HOLD ACKNOWLEDGE
365 0110           *
366 0110 3E 82     HLDA MVI A,MHLDA  GET MASK
367 0112 C3 14 02       JMP DOBIT
368 0115           *
369 0115           *  WRITE
370 0115           *
371 0115 3E 20     WR   MVI A,MWR    GET MASK
372 0117 C3 14 02       JMP DOBIT
373 011A           *
374 011A           *  INTERRUPT ACKNOWLEDGE
375 011A           *
376 011A 3E 81     INTA MVI A,MINTA  GET MASK
377 011C C3 14 02       JMP DOBIT
378 011F           *
379 011F           *  I/O OR MEMORY
380 011F           *
381 011F 3E 05     IO&M MVI A,MIO&M  GET MASK
382 0121 C3 14 02       JMP DOBIT
383 0124           *
384 0124           *  LOAD A REGISTER
385 0124           *
386 0124 CD 2B 00  LDA  CALL CRST    CONTROL RESET
387 0127 CD 69 02       CALL GA4     GET MEMORY ADDRESS
388 012A 21 6B 00  LDA2 LXI H,SLDA   CONTROL FUNCTIONS
389 012D CD 62 03       CALL CFUN3
390 0130 CD F5 01       CALL RBUS    READ BUS
391 0133 CD 2B 00       CALL CRST    CONTROL RESET
392 0136 C9             RET          DONE
393 0137           *
394 0137           *  STORE A REGISTER
395 0137           *
396 0137 CD 2B 00  STA  CALL CRST    CONTROL RESET
397 013A CD 69 02       CALL GA4     GET MEMORY ADDRESS
398 013D 21 6E 00       LXI H,SSTA   CONTROL FUNCTIONS
399 0140 CD 65 03       CALL CFUN2
400 0143 CD 3E 02       CALL GD2     GET DATA
401 0146 21 70 00       LXI H,SSTA2  CONTROL FUNCTIONS
402 0149 CD 65 03       CALL CFUN2
403 014C C9             RET          DONE
404 014D           *
405 014D           *  RESET
406 014D           *
407 014D C9        RSET RET
408 014E           *
409 014E           *  RAM TEST
410 014E           *
411 014E C9        RAM  RET
412 014F           *
413 014F           *  ROM TEST
414 014F           *
415 014F C9        ROM  RET
416 0150           *
417 0150           *  DEFINE FUNCTION
418 0150           *
419 0150 3A 99 11  DEF  LDA KMODE    EXECUTING ?
420 0153 B7             ORA A        SET FLAGS
421 0154 CA 5C 01       JZ DEF1      NO, DEFINE KEY
422 0157 AF             XRA A        YES, RESET MODE
423 0158 32 99 11       STA KMODE
424 015B C9             RET
425 015C           *
```

```
425 015C                    * DEFINE FUNCTION KEY HERE
427 015C                    *
428 015C AF          DEF1   XRA A              USE 4 DIGITS
429 015D 32 A1 11           STA ODISP
430 0160 21 00 00            LXI H,0           GET 0
431 0163 22 40 11            SHLD OLSB         ZERO DISPLAY
432 0166 CD 80 03            CALL DOUT         UPDATE
433 0169 CD E1 02  DEF2     CALL RKEY          GET FUNCTION KEY
434 016C FE 13              CPI CF1            F1 ?
435 016E CA 7E 01            JZ DEF3           YES
436 0171 FE 14              CPI CF2            F2 ?
437 0173 CA 84 01            JZ DEF4           YES
438 0176 FE 15              CPI CF3            F3 ?
439 0178 CA 8A 01            JZ DEF5           YES
440 017B C3 69 01            JMP DEF2          ONLY ACCEPT FUNCTION KEYS
441 017E 21 A6 11  DEF3     LXI H,KF1          DEFINE F1
442 0181 C3 8D 01            JMP DEF6
443 0184 21 6E 12  DEF4     LXI H,KF2          DEFINE F2
444 0187 C3 8D 01            JMP DEF6
445 018A 21 36 13  DEF5     LXI H,KF3          DEFINE F3
446 018D 22 94 11  DEF6     SHLD LPNTR         SAVE POINTER
447 0190 32 A0 11            STA OLSB          PUT KEY IN DISPLAY
448 0193 CD 80 03            CALL DOUT         UPDATE
449 0196 3A 9F 11            LDA OMSB          GET COUNT
450 0199 3C                  INR A             BUMP
451 019A 32 9F 11            STA OMSB          SAVE
452 019D CD E1 02            CALL RKEY         GET NEXT KEY
453 01A0 2A 94 11            LHLD LPNTR        GET POINTER
454 01A3 FE 05              CPI CREP           SINGLE STEP ?
455 01A5 CA A9 01            JZ DEF7           YES
456 01A8 77                  MOV M,A           NO, SAVE KEY
457 01A9 23        DEF7     INX H              BUMP POINTER
458 01AA FE 06              CPI CDEF           DONE ?
459 01AC C2 8D 01            JNZ DEF6          NO, CONTINUE
460 01AF C9                 RET                YES, QUIT
461 01B0
462 01B0                    * READ
463 01B0                    *
464 01B0 3E 07     RD       MVI A,MRD          GET MASK
465 01B2 C3 14 02            JMP DOBIT
466 01B5
467 01B5                    * FUNCTION 1
468 01B5                    *
469 01B5 21 A6 11  F1       LXI H,KF1          GET FUNCTION ADDRESS
470 01B8 C3 24 02            JMP FKEY          TREAT AS FUNCTION KEY
471 01BB
472 01BB                    * FUNCTION 2
473 01BB                    *
474 01BB 21 6E 12  F2       LXI H,KF2          GET FUNCTION ADDRESS
475 01BE C3 24 02            JMP FKEY          TREAT AS FUNCTION KEY
476 01C1
477 01C1                    * FUNCTION 3
478 01C1                    *
479 01C1 21 36 13  F3       LXI H,KF3          GET FUNCTION ADDRESS
480 01C4 C3 24 02            JMP FKEY          TREAT AS FUNCTION KEY
481 01C7
482 01C7                    * ADDRESS LATCH ENABLE
483 01C7                    *
484 01C7 3E 03     ALE      MVI A,MALE         GET MASK
485 01C9 C3 14 02            JMP DOBIT
486 01CC
487 01CC                    * S0 & S1 MODES
488 01CC                    *
489 01CC CD 35 02  S01      CALL GD1           GET DATA
490 01CF 32 93 11            STA REG1          SAVE
491 01D2 E6 01              ANI 1              STRIP LOW BIT
492 01D4 47                 MOV B,A            SAVE IN B
493 01D5 3E 00              MVI A,MSB          GET MASK
494 01D7 CD 3B 03            CALL DBIT         SET BIT
495 01DA 3A 93 11            LDA REG1          GET DATA AGAIN
```

```
496 01DD E6 02            ANI 2        STRIP NEXT BIT
497 01DF 47               MOV B,A      SAVE IN B
498 01E0 3E 01            MVI A,MS1    GET MASK
499 01E2 CD 3B 03         CALL DBIT    SET BIT
500 01E5 CD 60 03         CALL DOUT    UPDATE
501 01E8 C9               RET          DONE
502 01E9              *
503 01E9              * CLOCK
504 01E9              *
505 01E9 3E 03     CLK    MVI A,MCLK   GET MASK
506 01EB C3 14 02         JMP DOBIT
507 01EE              *
508 01EE              * REPEAT
509 01EE              *
510 01EE 3A 01 11   REP    LDA PKEY    GET PREVIOUS KEY
511 01F1 32 9A 11         STA RMODE    SAVE AS FLAG
512 01F4 C9               RET          DONE
513 01F5              *
514 01F5              * READ BUS
515 01F5              *
516 01F5 3E 0C     RBUS   MVI A,BCH    GET BLANKING CODE
517 01F7 32 A1 11         STA ODISP    SAVE
518 01FA 21 FB FF         LXI H,ADATI  GET ADDRESS
519 01FD 77               MOV M,A      STROBE LATCH
520 01FE 7E               MOV A,M      GET DATA
521 01FF 32 A0 11         STA OLSB     PUT IN DISPLAY
522 0202 CD 80 03         CALL DOUT    UPDATE
523 0205 C9               RET          DONE
524 0206              *
525 0206              * ENTER VALUE
526 0206              *
527 0206 2A 9B 11   ENTR   LHLD OADRL  GET ADDRESS
528 0209 23               INX H        BUMP
529 020A 22 9B 11         SHLD OADRL   AND SAVE
530 020D 7D               MOV A,L      GET LOW BYTE
531 020E 32 9E 11         STA ODATA    SAVE
532 0211 C3 2A 01         JMP LDA2     TREAT AS LDA
533 0214              *
534 0214              * DOBIT: GENERAL BIT COMMAND HANDLER
535 0214              *
536 0214 32 93 11   DOBIT  STA REG1    SAVE MASK
537 0217 CD 35 02         CALL GD1     GET DATA
538 021A 3A 93 11         LDA REG1     GET MASK
539 021D CD 3B 03         CALL DBIT    SET BIT
540 0220 CD 80 03         CALL DOUT    UPDATE
541 0223 C9               RET          DONE
542 0224              *
543 0224              * FKEY: GENERAL FUNCTION KEY HANDLER
544 0224              *
545 0224 22 94 11   FKEY   SHLD LPNTR  UPDATE LOOP POINTER
546 0227 3E 01            MVI A,1      SET KEYBOARD
547 0229 32 99 11         STA KMODE    LOCAL MODE
548 022C C9               RET          GO TO IT
549 022D              *
550 022D              ********************************************
551 022D              *                                          *
552 022D              * UTILITY SUBROUTINES                      *
553 022D              *                                          *
554 022D              ********************************************
555 022D              *
556 022D              * ADAHL: ADDS A TO HL RESULT IN HL, NO OTHER REGS. AFFECTE
557 022D              *
558 022D 85        ADAHL   ADD L
559 022E 6F                MOV L,A
560 022F D2 33 02          JNC ADAH
561 0232 24                INR H
562 0233 C9        ADAH    RET
563 0234              *
564 0234              *
```

```
565 0234         ****************************************************************
566 0234         *                                                                *
567 0234         *   ERROR ROUTINES                                                *
568 0234         *                                                                *
569 0234         ****************************************************************
570 0234         *
571 0234         *
572 0234 C9      ERR    RET
573 0235         *
574 0235         *
575 0235         ****************************************************************
576 0235         *                                                                *
577 0235         *   GET ADDRESS & DATA BYTES                                     *
578 0235         *                                                                *
579 0235         ****************************************************************
580 0235         *
581 0235         *  GET ONE DATA NIBBLE
582 0235         *
583 0235 3E 44   GD1    MVI  A,SD1      GET STATUS BYTE
584 0237 CD 85 02        CALL DIG0      GET 1ST DIGIT
585 023A CD D4 02        CALL QUAL      WAIT FOR ENTER
586 023D C9              RET            DONE
587 023E         *
588 023E         *  GET TWO DATA NIBBLES
589 023E         *
590 023E 3E 24   GD2    MVI  A,SD2      GET STATUS BYTE
591 0240 CD 85 02        CALL DIG0      GET 1ST DIGIT
592 0243 CD 9B 02        CALL DIG1      GET 2ND DIGIT
593 0246 CD D4 02        CALL QUAL
594 0249 32 9E 11        STA  ODATA     MUST BE DATA BYTE
595 024C C9              RET            DONE
596 024D         *
597 024D         *  GET TWO ADDRESS NIBBLES
598 024D         *
599 024D 3E 14   GA2    MVI  A,SA2      GET STATUS BYTE
600 024F CD 85 02        CALL DIG0      GET 1ST DIGIT
601 0252 CD 9B 02        CALL DIG1      GET 2ND DIGIT
602 0255 CD D4 02        CALL QUAL
603 0258 2A A0 11        LHLD OLSB      GET ADDRESS
604 025B 7D             MOV  A,L        MOVE TO A
605 025C 32 9E 11        STA  ODATA     SAVE
606 025F 22 9B 11        SHLD OADRL     SAVE
607 0262 32 9E 11        STA  ODATA     SAVE AS DATA
608 0265 32 9C 11        STA  OADRH     SAVE AS ADRH
609 0268 C9              RET            DONE
610 0269         *
611 0269         *  GET FOUR ADDRESS NIBBLES
612 0269         *
613 0269 3E 0C   GA4    MVI  A,SA4      GET STATUS BYTE
614 026B CD 85 02        CALL DIG0      GET 1ST DIGIT
615 026E CD 9B 02        CALL DIG1      GET 2ND DIGIT
616 0271 CD 9B 02        CALL DIG1      GET 3RD DIGIT
617 0274 CD 9B 02        CALL DIG1      GET 4TH DIGIT
618 0277 CD D4 02        CALL QUAL
619 027A 2A A0 11        LHLD OLSB      GET ADDRESS
620 027D 7D             MOV  A,L        SAVE IN A
621 027E 32 9E 11        STA  ODATA     SAVE
622 0281 22 9B 11        SHLD OADRL     SAVE
623 0284 C9              RET
624 0285         *
625 0285         *  SET LITE STATUS, GET 1ST DIGIT
626 0285         *
627 0285 32 A5 11 DIG0   STA  OSTAT     SAVE STATUS
628 0288 AF             XRA  A          GET ZERO
629 0289 32 A0 11        STA  OLSB      CLEAR DISPLAY
630 028C 32 9F 11        STA  OMSB      CLEAR DISPLAY
631 028F 3E 0F          MVI  A,0FH
632 0291 32 A1 11        STA  ODISP     BLANK DISPLAY
633 0294 CD 80 03        CALL DOUT      UPDATE
```

```
634 0297 CD 9B 02        CALL DIG1      GET A DIGIT
635 029A C9              RET            DONE
636 029B             *
637 029B             * GET ANOTHER DIGIT, (SHIFT THE OTHERS)
638 029B             *
639 029B CD E1 02 DIG1   CALL RKEY      WAIT FOR KEY
640 029E 0E FC           MVI C,252      PRESET C
641 02A0 0C       DIGA   INR C          ADD 4 TO C
642 02A1 0C              INR C
643 02A2 0C              INR C
644 02A3 0C              INR C
645 02A4 D6 07           SUI 7          SUBTRACT A ROW
646 02A6 F2 A0 02        JP DIGA        UNTIL NEGATIVE
647 02A9 C6 02           ADI 2          DO MAX CHECK
648 02AB F2 9B 02        JP DIG1        REJECT THIS KEY
649 02AE C6 04           ADI 4          COMPLETE RESTORE-1
650 02B0 81              ADD C          ADD IN ROW OFFSET
651 02B1 47              MOV B,A        SAVE NIBBLE IN B
652 02B2 3A A1 11        LDA ODISP      GET BLANKING
653 02B5 07              RLC            ROTATE
654 02B6 32 A1 11        STA ODISP      REPLACE
655 02B9 2A 9F 11        LHLD OMSB      GET DISPLAY DIGITS
656 02BC CD AC 03        CALL RLHL      ROTATE LEFT 4 PLACES
657 02BF CD AC 03        CALL RLHL
658 02C2 CD AC 03        CALL RLHL
659 02C5 CD AC 03        CALL RLHL
660 02C8 3E F0           MVI A,0F0H     STRIP
661 02CA A4              ANA H          OLD DIGIT
662 02CB B0              ORA B          MERGE NEW DIGIT
663 02CC 67              MOV H,A        REPLACE BYTE
664 02CD 22 9F 11        SHLD OMSB      REPLACE DISPLAY DIGITS
665 02D0 CD 80 03        CALL DOUT      UPDATE
666 02D3 C9              RET
667 02D4             *
668 02D4             * QUALIFICATION TEST
669 02D4             *
670 02D4 CD E1 02 QUAL   CALL RKEY
671 02D7 FE 1B           CPI 27         ENTER ?
672 02D9 C2 D4 02        JNZ QUAL       NOPE, TRYAGAIN
673 02DC 3A A0 11        LDA DLSB       GET LSB IN A
674 02DF 47              MOV B,A        MOVE TO B
675 02E0 C9              RET
676 02E1             *
677 02E1             *
678 02E1             ***********************************************
679 02E1             *                                             *
680 02E1             * THIS ROUTINE READS A KEY HIT FROM THE KEYBOARD. *
681 02E1             * IT DOES NOT RETURN UNTIL A VALID KEY PRESS HAS BEEN *
682 02E1             * DETECTED. ALL REGISTERS ARE USED AND KEY CODE IS *
683 02E1             * RETURNED IN THE A REGISTER.                  *
684 02E1             *                                             *
685 02E1             ***********************************************
686 02E1             *
687 02E1             * CHECK FOR LOCAL MODE
688 02E1             *
689 02E1 3A 99 11 RKEY   LDA KMODE      GET FLAG
690 02E4 B7              ORA A
691 02E5 C2 32 03        JNZ KLOC       SET ?
692 02E8             *
693 02E8             * CHECK FOR REPEAT KEY
694 02E8             *
695 02E8 3A 9A 11        LDA RMODE      GET FLAG
696 02EB B7              ORA A          SET ?
697 02EC F0              RP             YES
698 02ED             *
699 02ED             * WE WILL NOW READ A KEY FROM THE USER
700 02ED             *
701 02ED 3A 92 11        LDA LKEY       UPDATE OLD
702 02F0 32 91 11        STA PKEY       VALUE
```

```
703 02F3 21 FF FD        LXI  H,AKYBD    SET M TO KEYBOARD ADDRESS
704 02F6              *
705 02F6              * DELAY FROM LAST KEY HIT
706 02F6              *
707 02F6 06 64   KEY0  MVI  B,KTIME      SET TIMER
708 02F8 3A 98 11 KEY1 LDA  SMASK        RESTORE MASK
709 02FB BE            CMP  M            KEY DOWN ?
710 02FC CA F6 02       JZ  KEY0         YES, RESET TIMER
711 02FF 05            DCR  B            NO, DECREMENT TIMER
712 0300 C2 F8 02      JNZ  KEY1         TEST KEY AGAIN
713 0303              *
714 0303              * COLUMN SCAN
715 0303              *
716 0303 06 7F         MVI  B,7FH        INIT SCAN BYTE
717 0305 78     RKEY2  MOV  A,B          SCAN BYTE IN A
718 0306 07            RLC               ROTATE A LEFT
719 0307 47            MOV  B,A          SAVE IN B REG
720 0308 32 A4 11      STA  OKYBD        SAVE IN OUTPUT BUFFER
721 030B 77            MOV  M,A          SEND TO KEYBOARD
722 030C              *
723 030C              * ROW SCAN, LOOK FOR SINGLE KEY HIT
724 030C              *
725 030C 0E 07         MVI  C,7          INIT COUNT
726 030E 3E BF         MVI  A,0BFH       INIT SCAN MASK
727 0310 0F     RKEY3  RRC               ROTATE A RIGHT
728 0311 0D            DCR  C            DONE ?
729 0312 CA 05 03       JZ  RKEY2        YES, NO HIT, GO BACK
730 0315 BE            CMP  M            NO, IS KEY DOWN ?
731 0316 C2 10 03      JNZ  RKEY3        NO, CONTINUE ROW SCAN
732 0319              *
733 0319              * KEY DOWN HAS BEEN DETECTED
734 0319              *
735 0319 32 98 11      STA  SMASK        SAVE SCAN MASK
736 031C              *
737 031C              * CONVERT COLUMN TO 1-7
738 031C              *
739 031C 78            MOV  A,B          GET COLUMN
740 031D 06 00         MVI  B,0
741 031F 04     RKEY7  INR  B
742 0320 0F            RRC               LOOK FOR BIT
743 0321 DA 1F 03       JC  RKEY7        NOT FOUND
744 0324 78            MOV  A,B          INIT A
745 0325              *
746 0325              * ADD IN ROW TIMES 7
747 0325              *
748 0325 0D     RKEY8  DCR  C
749 0326 CA 2E 03       JZ  RKEY9        DONE ?
750 0329 C6 07         ADI  7            NO, ADD ANOTHER 7
751 032B C3 25 03      JMP  RKEY8
752 032E              *
753 032E              * DONE AT LAST
754 032E              *
755 032E 32 92 11 RKEY9 STA LKEY         SAVE FOR PREVIOUS KEY
756 0331 C9            RET
757 0332              *
758 0332              * LOCAL KEYBOARD MODE, GET KEY FROM MEMORY, NOT USER
759 0332              *
760 0332 2A 94 11 KLOC LHLD LPNTR        GET LOOP POINTER
761 0335 7E            MOV  A,M          GET KEY CODE
762 0336 23            INX  H            BUMP POINTER
763 0337 22 94 11      SHLD LPNTR        AND SAVE
764 033A C9            RET               RETURN WITH KEY CODE
765 033B              *
766 033B              *
767 033B              ************************************************************
768 033B              *
769 033B              * DBIT: THIS SETS OR CLEARS ONE BIT BASED ON VALUE OF THE
770 033B              *       B REG, BIT DETERMINED BY A REG.
771 033B              *
```

```
772 033B                    ************************************************
773 033B                    *
774 033B                    *
775 033B 11 A2 11  DBIT  LXI D,OCNT1      GET CONTROL BYTE ADDRESS
776 033E 87              ORA A            CNT2 BIT SET
777 033F F2 43 03        JP DBIT2         NO, SKIP BUMP
778 0342 13              INX D            STEP TO 2ND BYTE
779 0343 E6 7F   DBIT2 ANI 7FH            CLEAR CNT2 BIT
780 0345 21 5A 03        LXI H,BMD        GET BIT MASK TABLE ADR
781 0348 CD 20 82        CALL ADAHL       ADD OFFSET TO HL
782 034B 78              MOV A,B          GET VALUE
783 034C 87              ORA A            SET FLAGS
784 034D 7E              MOV A,M          GET MASK
785 034E EB              XCHG             SAVE DATA ADDRESS
786 034F CA 56 03        JZ DBIT3         ZERO ?
787 0352 B6              ORA M            NO, SET BIT
788 0353 C3 58 03        JMP DBIT4        CONTINUE
789 0356 2F       DBIT3 CMA               NEED TO CLEAR BIT
790 0357 A6              ANA M            CLEAR IT
791 0358 77       DBIT4 MOV M,A           REPLACE DATA
792 0359 C9              RET              DONE
793 035A                 *
794 035A 01       BMD   DB 1
795 035B 02             DB 2
796 035C 04             DB 4
797 035D 08             DB 8
798 035E 10             DB 16
799 035F 20             DB 32
800 0360 40             DB 64
801 0361 80             DB 128
802 0362                 *
803 0362                 *
804 0362                 ************************************************
805 0362                 *
806 0362                 * THESE ROUTINES ARE USED TO MANIPULATE CONTROL WORD BITS
807 0362                 *
808 0362                 ************************************************
809 0362                 *
810 0362                 *
811 0362                 * THIS GUY EXECUTES CONTROL BIT ARRAYS
812 0362                 *
813 0362 CD 6C 03 CFUN3 CALL CFUN
814 0365 CD 6C 03 CFUN2 CALL CFUN
815 0368 CD 6C 03       CALL CFUN
816 036B C9              RET
817 036C                 *
818 036C                 * THIS GUY DOES ONE WORD OF CONTROL BIT ARRAYS
819 036C                 *
820 036C 22 96 11 CFUN  SHLD L2           SAVE ADDRESS
821 036F 7E              MOV A,M          GET DATA
822 0370 32 A2 11        STA OCNT1        SAVE IN BUFFER
823 0373 CD 80 03        CALL DOUT        UPDATE
824 0376 2A 96 11        LHLD L2          GET ADDRESS
825 0379 23              INX H            STEP TO NEXT BYTE
826 037A C9              RET
827 037B                 *
828 037B                 * THIS GUY SETS A SINGLE CONTROL BIT AS PER A REG MASK
829 037B                 *
830 037B 06 01    SET   MVI B,1           GET DATA
831 037D C3 25 00        JMP CLR2         REUSE CLEAR CODE
832 0380                 *
833 0380                 *
834 0380                 ************************************************
835 0380                 *
836 0380                 * DOUT: UPDATES ALL SST OUTPUTS, HANDLES DBUS BIT
837 0380                 *
838 0380                 *
839 0380                 *
840 0380                 ************************************************
```

```
841 0380              *
842 0380              * HANDLE DBUS BIT
843 0380              *
844 0380 06 00    DOUT  MVI  B,0         ASSUME CLEAR REQUIRED
845 0382 3A A2 11       LDA  OCNT1       GET CONTROL WORD 1
846 0385 B7             ORA  A           SET FLAG
847 0386 FA 8B 03       JM   DOUT1       SET ?
848 0389 06 01          MVI  B,1         NO, SET DBUS BIT
849 038B 3E 80    DOUT1 MVI  A,MDBUS     GET MASK
850 038D CD 38 03       CALL DBIT        UPDATE BIT
851 0390              *
852 0390              * DO OUTPUT
853 0390              *
854 0390 21 FE FF       LXI  H,AADRL     GET STARTING ADDRESS
855 0393 11 96 11       LXI  D,DADRL     GET DATA ADDRESS
856 0396 0E 08          MVI  C,NUMA      SET COUNTER
857 0398 1A       DOUT2 LDAX D           GET DATA
858 0399 77             MOV  M,A         OUTPUT
859 039A 13             INX  D           BUMP DATA ADDRESS
860 039B CD AC 03       CALL RLHL        ROTATE LEFT HL ADDRESS
861 039E 0D             DCR  C           DEC COUNTER
862 039F C8             RZ               DONE ?
863 03A0 C3 98 03       JMP  DOUT2       NO
864 03A3              *
865 03A3              *
866 03A3              ***********************************************
867 03A3              *
868 03A3              *   MVAR:  MOVE C BYTES FROM ADDRESS HL TO ADDRES DE
869 03A3              *
870 03A3              ***********************************************
871 03A3              *
872 03A3              *
873 03A3 7E       MVAR  MOV  A,M         GET BYTE
874 03A4 12             STAX D           SAVE
875 03A5 23             INX  H           BUMP SOURCE
876 03A6 13             INX  D           BUMP DESTINATION
877 03A7 0D             DCR  C           CHECK LENGTH
878 03A8 C8             RZ               DONE
879 03A9 C3 A3 03       JMP  MVAR
880 03AC              *
881 03AC              *
882 03AC              ***********************************************
883 03AC              *
884 03AC              *   ROTATE HL LEFT
885 03AC              *
886 03AC              *   B REG UNAFFECTED
887 03AC              *
888 03AC              ***********************************************
889 03AC              *
890 03AC              *
891 03AC 7C       RLHL  MOV  A,H         TEST HIGH BIT
892 03AD B7             ORA  A
893 03AE 37             STC              ASSUME SET
894 03AF FA B3 03       JM   RLHL2       SKIP CLEAR IF SET
895 03B2 3F             CMC              CLEAR FLAG
896 03B3 7D       RLHL2 MOV  A,L         GET LOW BYTE
897 03B4 17             RAL              ROTATE, SET CARRY TO HIGH BIT
898 03B5 6F             MOV  L,A         REPLACE
899 03B6 7C             MOV  A,H         GET HIGH BYTE
900 03B7 17             RAL              ROTATE
901 03B8 67             MOV  H,A         REPLACE
902 03B9 C9       ZEND  RET              DONE
903 03BA                END
```

0 ERRORS          154 SYMBOLS

SYMBOL TABLE

| | | | | | | | | | |
|---|---|---|---|---|---|---|---|---|---|
| STACK | 119A | VARAB | 1191 | AADRL | FFFE | AADRM | FFFD | ADATI | FFFB | ADATO | FFF7 |
| AMSB | FFEF | ALSB | FFDF | ADISP | FFBF | ACNT1 | FF7F | ACNT2 | FEFF | AKYBD | FDFF |
| ASTAT | FBFF | NUMA | 00C8 | SCMD | 00B1 | SFAIL | 00C2 | SD1 | 0044 | SD2 | 0024 |
| SA2 | 0014 | SA4 | 000C | MSB | 0000 | MS1 | 00E1 | MSOD | 0002 | MALE | 00F3 |
| MRED | 0004 | MIDLM | 0005 | MWR | 0006 | MRD | 0007 | MDBUS | 0008 | MINTA | 0061 |
| MHLDA | 0082 | MCLK | 0063 | KTIME | 0064 | NINIT | 002E | CREP | 0005 | CDEF | 0006 |
| CLDA | 000C | CF1 | 0013 | L2 | 1196 | CF3 | 0015 | PKEY | 1191 | LKEY | 1192 |
| REG1 | 1193 | LPNTR | 1194 | L2 | 1196 | SMASK | 1156 | KMODE | 1199 | RMODE | 119A |
| OADRL | 119B | OADRM | 119C | IDATA | 119D | ODATA | 119E | OMSB | 119F | OLSB | 11A0 |
| ODISP | 11A1 | OCNT1 | 11A2 | OCNT2 | 11A3 | OKYBD | 11A4 | OSTAT | 11A5 | KF1 | 11A6 |
| KF2 | 126E | KF3 | 1336 | RESET | 0000 | CLR | 0023 | CLR2 | 0025 | CRST | 002B |
| CRST2 | 0031 | RST7 | 0036 | RST7B | 0047 | OINIT | 0056 | SINT | 0060 | SINT2 | 0061 |
| SIN | 0064 | SOUT | 0067 | SOUT2 | 0069 | SLDA | 006B | SSTA | 006E | SSTA2 | 0070 |
| CMD | 0072 | JMTAB | 008E | ADR | 00C4 | SALE | 00CA | DATA | 00D5 | RED | 00DC |
| SDD | 00E1 | IN | 00E6 | OUT | 00F9 | CE | 01FF | HLDA | 0110 | WR | 0115 |
| INTA | 011A | IOLM | 011F | LDA | 0124 | LDA2 | 012A | STA | 0137 | RSET | 014D |
| RAM | 014E | ROM | 014F | OEF | 0150 | DEF1 | 015C | DEF2 | 0169 | DEF3 | 017E |
| DEF4 | 0184 | DEF5 | 018A | DEF6 | 018D | DEF7 | 01A9 | RD | 01B0 | F1 | 01B5 |
| F2 | 01BB | F3 | 01C1 | ALE | 01C7 | S01 | 01CC | CLK | 01E9 | REP | 01EE |
| RBUS | 01F5 | ENTR | 0206 | DOBIT | 0214 | FKEY | 0224 | ADAHL | 022D | ADAH | 0233 |
| ERR | 0234 | GD1 | 0235 | GD2 | 023E | GA2 | 024D | GA4 | 0269 | DIG0 | 0285 |
| DIG1 | 0298 | DIGA | 02A0 | QUAL | 02D4 | RKEY | 02E1 | KEY0 | 02F6 | KEY1 | 02F8 |
| RKEY2 | 0305 | RKEY3 | 0310 | RKEY7 | 031F | RKEY6 | 0325 | RKEY5 | 032E | KLOC | 0332 |
| DBIT | 033B | DBIT2 | 0343 | DBIT3 | 0356 | DBIT4 | 035B | BMD | 035A | CFUN3 | 0362 |
| CFUN2 | 0365 | CFUN | 036C | SET | 037B | DOUT | 0380 | DOUT1 | 0388 | DOUT2 | 0398 |
| MVAR | 03A3 | RLHL | 03AC | RLHL2 | 03B3 | ZEND | 03B9 | | | | |

I claim:

1. A static stimulus testing device for testing an electronic system from which has been removed a system digital electronic microprocessor which is normally included in said system, said device comprising:
   a plurality of input-output ports corresponding to the input/output pins of the system microprocessor of the system under test; and
   control means for enabling a user to independently control the logic levels of each input/output port, so that when the testing device is connected to the system under test, in place of said removed system microprocessor system, the user will have control of the logic levels of each input/output line independent of the logic levels of the other lines of the system under test, which are normally controlled by said removed system microprocessor;
   data entry means interconnected with said control means for entering into said device information to control said electronic system;
   and display means interconnected with said control means for displaying from said device information about the state of said electronic system under test.

2. A device as in claim 1 wherein said control means further comprises:
   ROM memory means for storing digital computer programs used by said device; and
   test digital microprocessor means for communicating among said memory means, data entry means, said display means and said input-output ports.

3. A device as in claim 2 wherein said control means further comprises:
   RAM memory means for providing temporary storage of data for use by said test microprocessor means.

4. A device as in claim 3 wherein said data entry means comprises a keyboard having thereon a plurality of keys for entering of information into said device.

5. A device as in claim 4 wherein said display means comprises a hexadecimal display.

* * * * *